United States Patent
Bryant et al.

(10) Patent No.: US 7,066,010 B2
(45) Date of Patent: Jun. 27, 2006

(54) HYDROSTATIC TEST SYSTEM AND METHOD

(75) Inventors: Layton Bryant, Shreveport, LA (US); Eric Burch, Shreveport, LA (US)

(73) Assignee: Milbar Hydro-Test, Inc., Shreveport, LA (US)

( * ) Notice: Subject to any disclaimer, the term of this patent is extended or adjusted under 35 U.S.C. 154(b) by 65 days.

(21) Appl. No.: 10/842,950

(22) Filed: May 11, 2004

(65) Prior Publication Data

US 2005/0252278 A1  Nov. 17, 2005

(51) Int. Cl.
*G01M 3/02* (2006.01)

(52) U.S. Cl. .................................. 73/40.5 R
(58) Field of Classification Search ............. 73/40.5 R, 73/40.5 A
See application file for complete search history.

(56) References Cited

U.S. PATENT DOCUMENTS

| | | | | |
|---|---|---|---|---|
| 3,756,072 A | * | 9/1973 | MacMurray | 73/40.5 R |
| 3,851,521 A | | 12/1974 | Ottenstein | |
| 4,429,566 A | * | 2/1984 | Armell et al. | 73/40.7 |
| 4,474,055 A | | 10/1984 | Bergeron, Jr. | |
| 4,519,238 A | | 5/1985 | Hailey | |
| 4,926,680 A | * | 5/1990 | Hasha et al. | 73/46 |
| 5,157,958 A | * | 10/1992 | Geisinger | 73/1.02 |
| 5,269,171 A | * | 12/1993 | Boyer | 73/40.5 R |
| 5,377,530 A | | 1/1995 | Allen et al. | |
| 5,381,136 A | * | 1/1995 | Powers et al. | 340/539.26 |
| 5,390,532 A | * | 2/1995 | Anthony | 73/40.5 R |
| 5,428,989 A | | 7/1995 | Jerde et al. | |
| 5,440,918 A | * | 8/1995 | Oster | 73/40.5 R |
| 5,461,905 A | * | 10/1995 | Penisson | 73/46 |
| 5,526,678 A | | 6/1996 | Shaw et al. | |
| 5,548,993 A | * | 8/1996 | Alexander | 73/49.5 |
| 5,587,521 A | | 12/1996 | Lanasa | |
| 5,708,195 A | | 1/1998 | Kurisu et al. | |
| 5,850,037 A | * | 12/1998 | Mullins | 73/40.5 R |
| 5,866,803 A | | 2/1999 | Namba et al. | |
| 5,898,105 A | * | 4/1999 | Owens | 73/49.8 |
| 5,983,706 A | * | 11/1999 | Marks et al. | 73/37 |
| 6,348,869 B1 | * | 2/2002 | Ashworth | 340/605 |
| 6,351,985 B1 | * | 3/2002 | Bedwell | 73/49.8 |
| 6,354,147 B1 | | 3/2002 | Gysling et al. | |
| 6,378,356 B1 | * | 4/2002 | Ruiz et al. | 73/37 |
| 6,390,118 B1 | * | 5/2002 | Mankins | 137/318 |
| 6,435,010 B1 | | 8/2002 | Johnson et al. | |
| 6,442,999 B1 | | 9/2002 | Baumoel | |
| 6,446,491 B1 | * | 9/2002 | Pompa et al. | 73/40.5 R |
| 6,530,263 B1 | * | 3/2003 | Chana | 73/40.5 R |
| 6,539,777 B1 | * | 4/2003 | Ashworth et al. | 73/49.1 |
| 6,612,618 B1 | * | 9/2003 | Giordano | 285/12 |
| 6,691,556 B1 | * | 2/2004 | Wheeler et al. | 73/40.5 R |

(Continued)

OTHER PUBLICATIONS

Bentek Systems; Wireless SCADA/RTU; 2 pages; http://www.scadalink.com/scada.htm.

(Continued)

*Primary Examiner*—Hezron Williams
*Assistant Examiner*—John Fitzgerald
(74) *Attorney, Agent, or Firm*—Haynes and Boone, LLP

(57) ABSTRACT

A system and method of hydrostatic testing a pipeline that is not in service, according to which the pipeline is hydrostatically pressurized and a portable remote telemetry unit is temporarily connected to the pipeline for measuring variables corresponding to the hydrostatic pressurization. Data corresponding to the variable measurements is transmitted to a central location and the portable remote telemetry unit is disconnected from the pipeline.

36 Claims, 5 Drawing Sheets

U.S. PATENT DOCUMENTS

2002/0030604 A1 3/2002 Chance et al.
2002/0199121 A1 12/2002 Stanford-Clark

OTHER PUBLICATIONS

Bentek Systems; SCADA*ink* SOLAR—Wireless RTU for Injection Well; 2 pages; http://www.scadalink.com/slsolar.htm.

Bentek Systems: SCADA Applications—Oil & Gas; 2 pages; http://www.scadalink.com/slappoil.htm.

Bentek Systems: SCADA Applications—Water; Municipal Water System—Tail End Data Extension & Wide Area Scada; 2 pages; http://www.scadalink.com/slappwatdataextend5.htm.

Sasktel; Site.link; 1 page; http://www.sitelinkdata.com/index.html.

Dr. Andy Stanford-Clark; IBM Presentation, Telemetry Integration—Enterprise integration of SCADA, remote monitoring and control devices using WebSphere MQ Integrator.

* cited by examiner

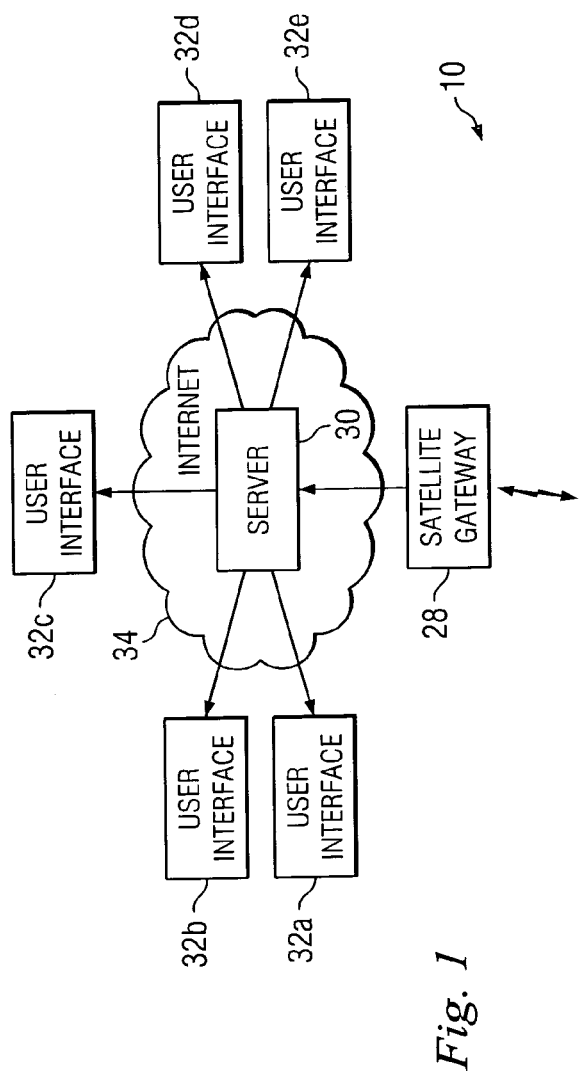
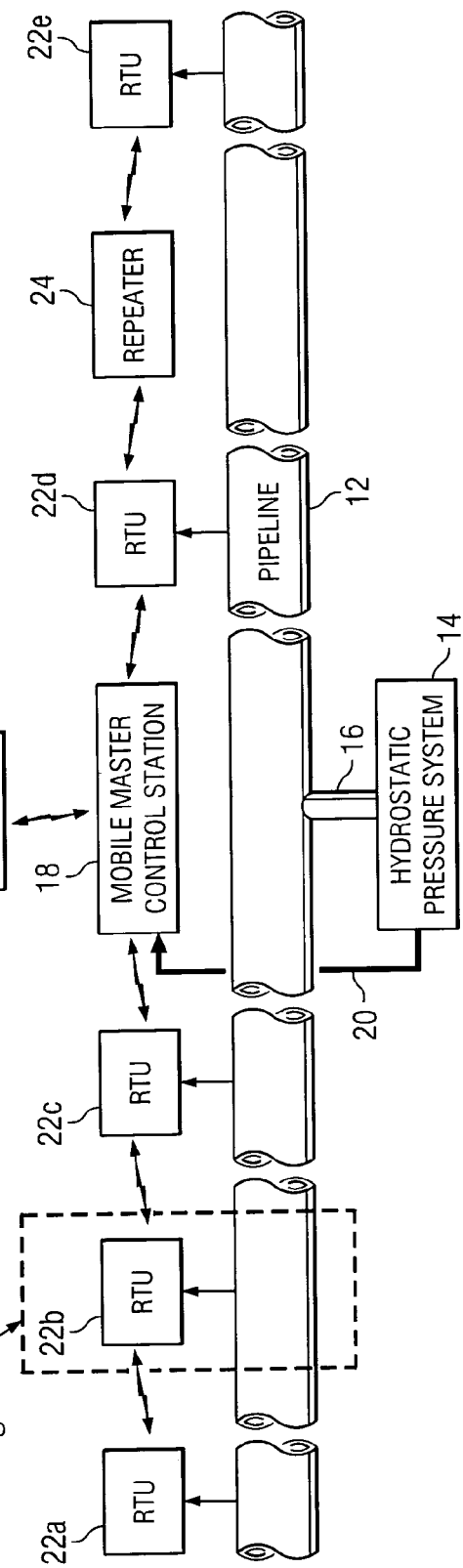
Fig. 1
Fig. 2

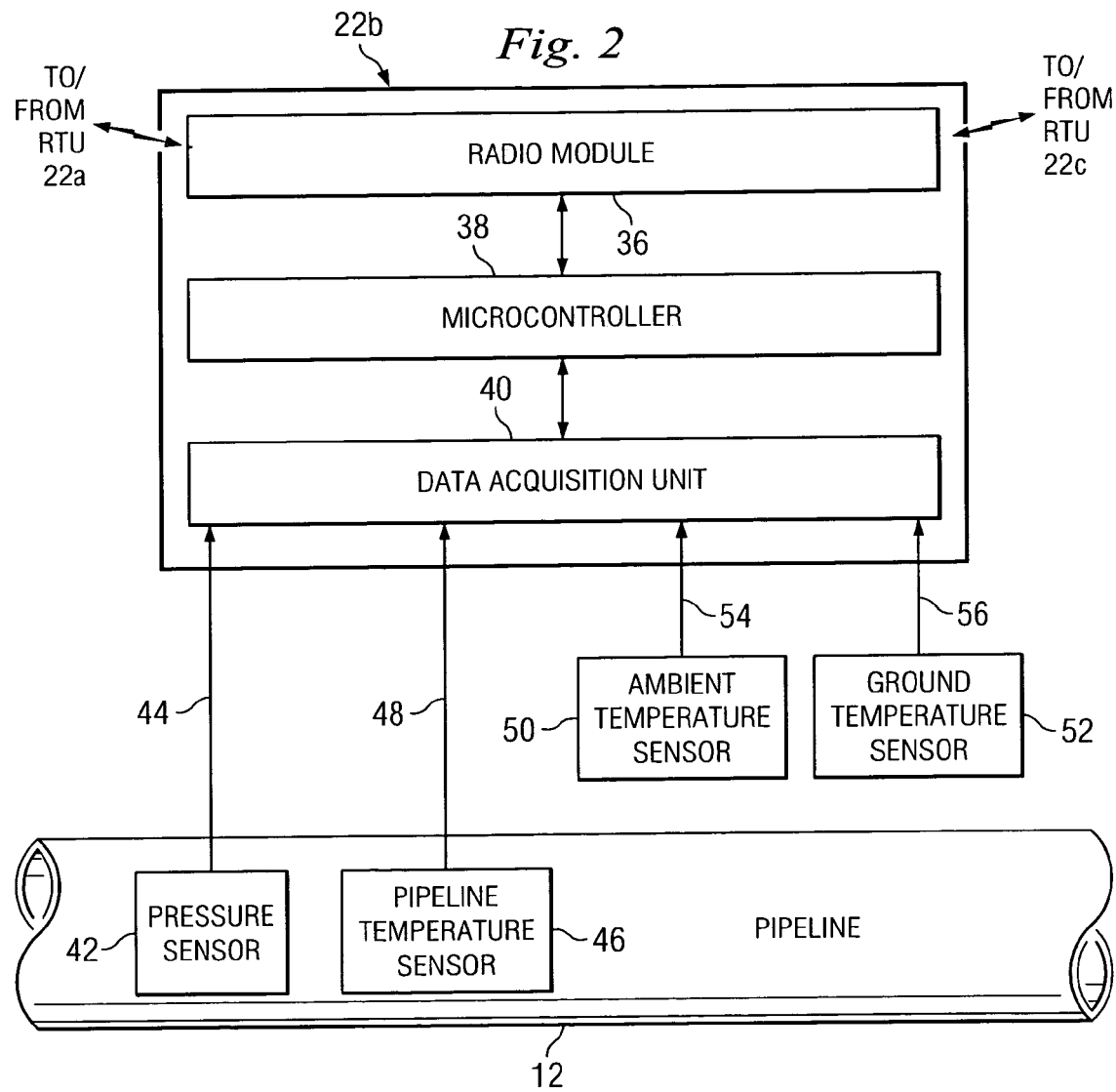

HYDROSTATIC TEST SYSTEM AND METHOD

BACKGROUND

This invention relates generally to pressure testing and, more particularly, to the hydrostatic testing of pipelines.

Hydrostatic testing of a pipeline may be conducted to verify the structural integrity of the pipeline and to comply with applicable federal and/or state regulations. Conventional hydrostatic testing involves filling and pressurizing the pipeline with water. Measurement instruments, such as circular chart recorders and deadweight pressure gauges, are connected to the pipeline to measure variables such as the temperature and internal pressure of the pipeline. Measurement readings, such as pressure gauge readings recorded by the test operator and readings recorded by the circular chart recorders, are typically transcribed by hand into a "test log," a document that serves as a record of the hydrostatic test. The measurement data contained in the test log may be used to perform pressure loss/gain rate and temperature/pressure reconciliation calculations, and to plot pressure as a function of volume in order to provide an indication of pipe yield.

However, several problems may arise during the conventional hydrostatic testing of the pipeline. For example, the pipeline operator's representative at the test site typically does not have the authority to accept the test as successful and must send the measurement data and any necessary calculation results and/or plots to an individual who is offsite and has such authority, increasing the amount of time required for test acceptance or rejection and thereby increasing the cost of the test, in terms of both test overhead costs and the out-of-service status of the pipeline. Also, the above-described transcribing, calculating and plotting are typically performed by hand by test personnel, and as such are time-intensive processes that also increase the testing time and therefore the overall cost of the test.

Further, test personnel are usually required to be in close proximity to the pipeline at various locations along the pipeline in order to record measurement readings. In addition to the time and cost increases associated with stationing personnel along the pipeline, this arrangement also creates a safety hazard in that the pipeline could structurally fail at any location during the test, possibly injuring any nearby test personnel. Moreover, the above-described transcribing and data-processing operations conducted by hand by test personnel are susceptible to error in that the measurements may be incorrectly recorded and the calculations may contain mistakes.

Therefore, what is needed is a hydrostatic test system and method that overcomes the above-described problems, among others.

BRIEF DESCRIPTION OF THE DRAWINGS

FIG. 1 is a partial schematic/partial elevational view depicting a hydrostatic test system according to an embodiment.

FIG. 2 is a schematic view of a portable remote telemetry unit of the system of FIG. 1.

DETAILED DESCRIPTION

Figure 3:
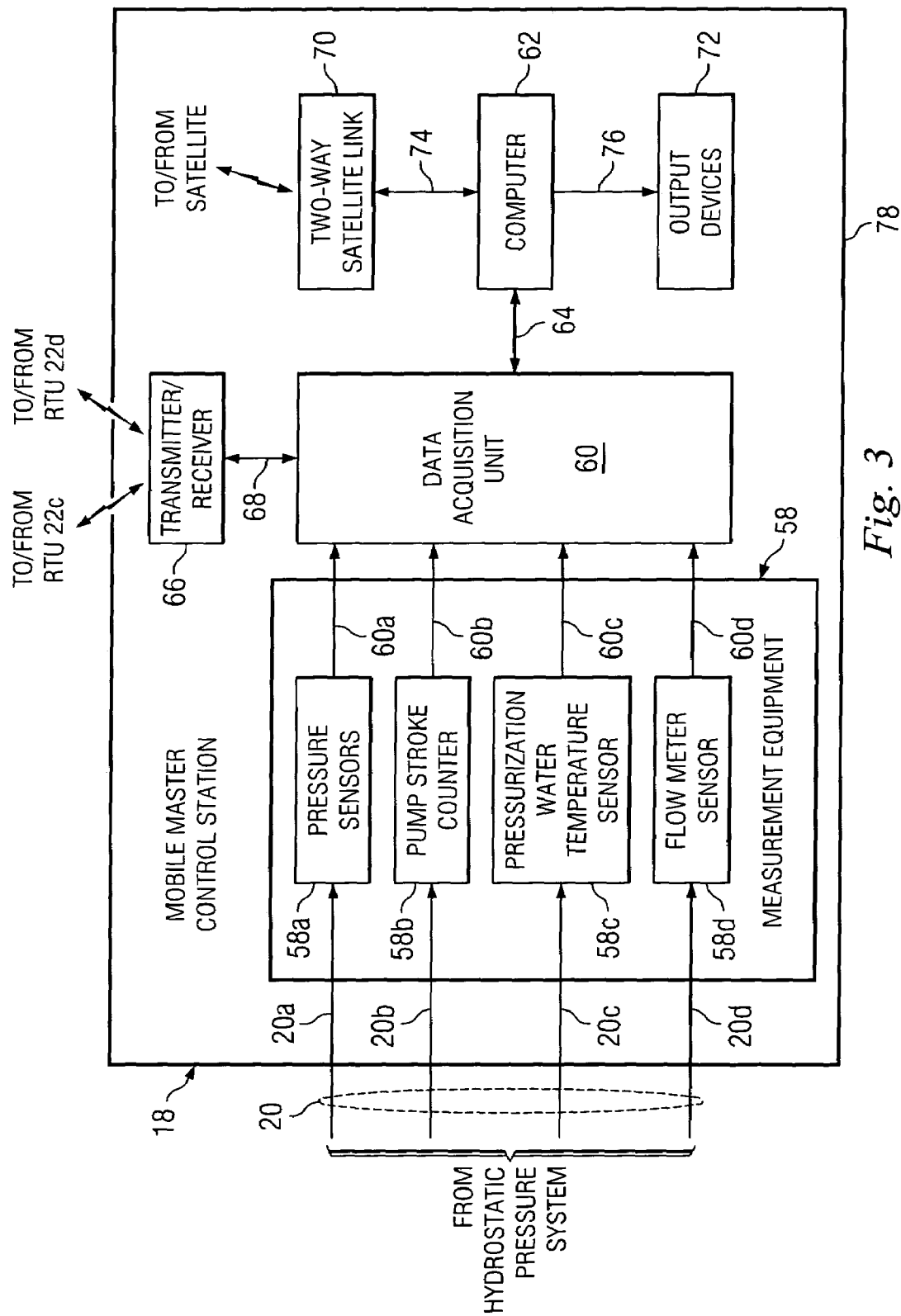
FIG. 3 is a schematic view of a mobile master control station of the system of FIG. 1 according to an embodiment.

Referring to FIG. 1 of the drawings, the reference numeral 10 refers in general to a hydrostatic test system employed to test a pipeline 12. A hydrostatic pressure system 14 for generating hydrostatic pressure in the pipeline 12 is connected to the pipeline in a conventional manner via one or more lines 16. The pressure system 14 is conventional and may be comprised of, for example, one or more high-pressure positive displacement pumps, water sources, and test headers including risers, blinds and valves, along with all necessary high-pressure fittings, piping and hoses. A mobile master control station 18 is connected to the pressure system 14 in a conventional manner for controlling the pressure system. A plurality of lines 20 for monitoring the pressure system 14 and the pipeline 12 are connected between the mobile station 18 and the pressure system 14. The mobile station 18 and the lines 20 will be discussed in more detail below. It is understood that the pressure system 14 and the lines 16 may be positioned at any location along the pipeline 12.

A plurality of portable remote telemetry units (or RTUs) 22a, 22b, 22c, 22d and 22e are connected to the pipeline 12. It is understood that the number of RTUs 22 may vary from one to an unlimited number and that several factors generally known in the art may be used to determine the number of RTUs 22, along with determining the location of and spacing between the RTUs 22 along the pipeline 12. Such factors may include all applicable federal and/or state hydrostatic testing regulations, and "line-of-sight" considerations between the RTUs 22, including the environment through which the pipeline 12 extends. The RTU 22a is in two-way wireless communication with the RTU 22b which, in turn, is in two-way wireless communication with the RTU 22c. The mobile station 18 is in two-way wireless communication with the RTU 22c.

A portable repeater 24 is positioned between the RTUs 22d and 22e. The repeater 24 is conventional and may comprise a 900-MHz spread spectrum data radio and a high-gain omni-directional or Yagi antenna connected to a 10-meter antenna mast assembly. The repeater 24 may be solar powered in which case the repeater further comprises a solar panel coupled to a charging regulator and a wet cell battery. Various components of the repeater 24 may be housed in a waterproof fiberglass enclosure which may be mounted, along with the solar panel, to a portable stand. The RTU 22e is in two-way wireless communication with the repeater 24 which, in turn, is in two-way wireless communication with the RTU 22d. The mobile station 18 is in two-way wireless communication with the RTU 22d. Each RTU 22 and its connection with the pipeline 12 will be described in more detail below. It is understood that, as necessary, additional repeaters 24 may be positioned in the test system 10 between additional RTUs 22 such as, for example, between the RTUs 22a and 22b and between the RTUs 22b and 22c. Also, it is understood that, if necessary, a repeater 24 may be positioned between the RTU 22c and the mobile station 18, and between the RTU 22d and the mobile station 18.

A satellite 26 is in two-way wireless communication with the mobile station 18. The satellite 26 is also in two-way wireless communication with a satellite gateway 28 which, in turn, is coupled to a server 30. A plurality of user interfaces 32*a*, 32*b*, 32*c*, 32*d* and 32*e* are coupled to the server 30 via a data network 34 such as the Internet. It is understood that the user interfaces 32 may be, for example, cellular telephones, personal digital assistants, personal computers or other types of computing devices. It is further understood that the number of user interfaces 32 may vary from one to an unlimited number.

As shown in FIG. 2, the RTU 22*b* includes a radio module 36 for receiving data from the RTU 22*a* and sending the data to the RTU 22*c* under conditions to be described. The radio module 36 may comprise a 900-MHz spread spectrum radio and a high-gain omni-directional or Yagi antenna connected to a 10-meter antenna mast assembly. A programmable microcontroller 38 is coupled to the radio module 36 and a data acquisition unit 40. It is understood that the data acquisition unit 40 may be integrally combined with the microcontroller 38 and/or the radio module 36.

The data acquisition unit 40 is connected to a pressure sensor 42 via a signal line 44, and the pressure sensor is in turn connected to the pipeline 12 in any conventional manner suitable for measuring the internal pressure of the pipeline. The data acquisition unit 40 is also connected to a pipeline temperature sensor 46 via a signal line 48, and the pipe temperature sensor is in turn connected to the pipeline 12 in any conventional manner suitable for measuring the temperature of the pipeline. It is understood that the sensor 46 may be alternatively connected in a conventional manner suitable for measuring the temperature of the medium contained within the pipeline 12, such as water. Ambient and ground temperature sensors 50 and 52 are also connected to the data acquisition unit 40 via signal lines 54 and 56, respectively, for measuring the temperature of the ambient air and the ground, respectively.

The RTU 22*b* may be solar powered so that the RTU further comprises a solar panel coupled to a charging regulator and a wet cell battery. Various components of the RTU 22*b*, including the data acquisition unit 40, the microcontroller 38 and a portion of the radio module 36, may be housed in a waterproof fiberglass enclosure which may be mounted, along with the solar panel, to a portable stand. It is understood that the other RTUs 22 are substantially similar to the RTU 22*b* and therefore will not be described.

Referring to FIG. 3, the mobile station 18 includes measurement equipment 58 connected to the hydrostatic pressure system 14 (as shown in FIG. 1) via the plurality of lines 20, which includes lines 20*a*, 20*b*, 20*c* and 20*d*. A plurality of pressure sensors 58*a* are connected to the pressure system 14 via the line 20*a*, and a pump stroke counter 58*b* is connected to the pressure system via the line 20*b*. Likewise, a pressurization water temperature sensor 58*c* and a flow meter sensor 58*d* are connected to the pressure system 14 via the lines 20*c* and 20*d*, respectively. It is understood that each line 20*a*, 20*b*, 20*c* or 20*d* may be comprised of one or more sub-lines as necessary for the particular measurement desired, and that the lines and sub-lines may be in the form of, for example, any type of cabling, piping, mechanical fastening systems or any combination thereof. It is further understood that, in addition to the foregoing, the measurement equipment 58 may include various other sensors, counters, meters and/or other measurement instruments for measuring additional variables associated with the pressure system 14 and/or the pipeline 12.

A data acquisition unit 60 is coupled to the pressure sensors 58*a*, the pump stroke counter 58*b*, the pressurization water temperature sensor 58*c* and the flow meter sensor 58*d* via signal lines 60*a*, 60*b*, 60*c* and 60*d*, respectively. The data acquisition unit 60 is in turn coupled to a programmable computer 62 via an interface 64. A transmitter-receiver 66 is coupled to the data acquisition unit 60 via an interface 68 for receiving data from one or more of the RTUs 22, and for communicating with and transmitting control signals to the RTUs 22. The transmitter-receiver 66 may include a high-gain omni-directional antenna. The computer 62 is coupled to a two-way satellite link 70 and a plurality of output devices 72 via interfaces 74 and 76, respectively. The output devices 72 may include, but are not limited to, graphical displays, printers and plotters.

A mobile enclosure 78 houses and/or is connected to the above-described components of the mobile station 18. It is understood that the mobile enclosure 78 may be in the form of any type of mobile apparatus such as, for example, a climate-controlled 16-foot trailer suitable for connection to an automotive vehicle. It is understood that the mobile master control station 18 may also include additional components that are necessary and/or appropriate for carrying out conventional hydrostatic testing of the pipeline 12 such as, for example, a distribution manifold, and components that are necessary for operation in the field, such as, for example, a generator and backup power supplies.

In operation, with continuing reference to FIGS. 1 through 3, the pipeline 12 is taken out of service, if necessary, by purging the pipeline of product (such as natural gas). The following components of the hydrostatic test system 10 are transported from another location to a location near the pipeline 12: the mobile master control station 18, the hydrostatic pressure system 14, the plurality of portable remote telemetry units (RTUs) 22 and the repeater 24. The mobile station 18 may be transported by hitching the mobile enclosure 78 to an automotive vehicle and driving the vehicle to the pipeline 12. The mobile station 18 and the pressure system 14 are positioned at a central location near the middle of the pipeline 12, as shown in FIG. 1. As necessary, various components of the pressure system 14 may be positioned near the pipeline 12 either upstream or downstream of this central location in a manner that would occur to one of ordinary skill in the art. Furthermore, it is understood that the pressure system 14 and the one or more lines 16 may be positioned at any location along the pipeline 12. The mobile station 18 and the pressure system 14 are then connected to one another, forming the above-described connections, and forming other connections suitable for carrying out conventional hydrostatic testing.

Each RTU in the plurality of portable RTUs 22 is transported to a predetermined location along the pipeline 12. As noted above, the RTUs 22 are located and spaced so that they are able to wirelessly receive data from the next RTU 22 located further away from the mobile station 18, and to wirelessly send the data to the next RTU 22 located closer to the mobile station 18, or to the mobile station 18 itself. Further, the RTUs 22 are located and spaced so that they are able to wirelessly receive control signals from the next RTU 22 located closer to the mobile station 18, or from the mobile station 18 itself, and to wirelessly send the control signals to the next RTU 22 located further away from the mobile station 18. Still further, the RTUs 22 are also located and spaced to comply with all applicable federal and/or state regulations concerning the hydrostatic testing of pipelines.

Each RTU 22 is temporarily connected to the pipeline 12 by connecting the corresponding pressure sensor 42 and the corresponding temperature sensor 46 to the pipeline. The corresponding ground temperature sensor 52 and the ambient temperature sensor 50 are positioned in contact with the ground and in the air, respectively, in a manner well known to those of ordinary skill in the art.

The repeater 24 is positioned between the RTUs 22*d* and 22*e* because the RTU 22*e* is not effectively able to send data to the RTU 22*d* due to topological considerations and/or the long-distance spacing between the RTUs 22*d* and 22*e*. As noted above, additional repeaters 24 may be positioned between other RTUs 22, as needed.

After the above-described components are set up in accordance with the foregoing and as shown in FIGS. 1 through 3, and all necessary components and systems are powered and operational, hydrostatic testing of the pipeline 12 may begin. The hydrostatic pressure system 14 operates in a conventional manner, such as by filling the out-of-service pipeline 12 with water and pressurizing the water to the test pressure or to pressures required by applicable federal and/or state regulations. It is understood that the computer 62 of the mobile station 18 may communicate with and control at least a portion of the operation of the pressure system 14.

The operation of the pressure system 14 is monitored using the measurement equipment 58. The pressure sensors 58*a* measure various pressure levels at various locations in the pressure system 14 and the pipeline 12. The counter 58*b* counts the number of strokes of the pump or pumps associated with the pressure system 14. The sensor 58*c* measures the temperature of the pressurization water provided to the pipeline 12 by the pressure system 14, and the sensor 58*d* measures the flow rate of the water. The sensors 58*a*, the counter 58*b*, and the sensors 58*c* and 58*d* send input signals corresponding to the physical measurements to the data acquisition unit 60 via the lines 60*a*, 60*b*, 60*c* and 60*d*, respectively, which converts, conditions and/or processes the signals and then transmits measurement data to the computer 62 via the interface 64. The computer 62 processes the data, stores the processed data, and outputs the processed data to one or more of the output devices 72, such as a graphical display, via the interface 76. Thus, performance characteristics of the pressure system 14 may be monitored from the mobile station 18 (and other distant locations as will be described). It is understood that the measurement equipment 58 may also be employed to take additional measurements attendant to the hydrostatic testing, including the temperature of the pipeline 12, the internal pressure of the pipeline 12, the ambient temperature and the ground temperature.

During the hydrostatic testing, measurements are taken at each RTU 22 location along the pipeline 12. With respect to an exemplary RTU 22 such as the RTU 22*b*, several measurements are taken at the location along the pipeline 12 corresponding to the location of the RTU 22*b*. The sensor 42 measures the internal pressure of the pipeline 12, and the sensor 46 measures the temperature of the pipeline 12. The sensors 50 and 52 measure the ambient and ground temperatures, respectively. The sensors 42, 46, 50, and 52 transmit input signals corresponding to their respective measurements to the data acquisition unit 40 via the signal lines 44, 48, 54 and 56, respectively. The data acquisition unit 40 converts, conditions and/or processes the signals and then transmits measurement data to the microcontroller 38.

The microcontroller 38 transmits the measurement data to the radio module 36 which then wirelessly transmits the data to the radio module 36 of the RTU 22*c* which, in turn, sends the data to the transmitter-receiver 66 of the mobile station 18. The radio module 36 of the RTU 22*b* also receives similar data transmissions from the radio module 36 of the RTU 22*a* and sends the data to the RTU 22*c* which, in turn, sends the data to the transmitter-receiver 66. It is understood that the RTU 22*b* may store the data received from the RTU 22*a* for a period of time before sending the data to the RTU 22*c*. The microcontroller 38 controls the measuring, transmitting, receiving, storing and sending operations of the RTU 22*b*, and all of these operations may occur simultaneously. The radio module 36 may also receive control signals from the transmitter-receiver 66 and via the RTU 22*c* so that the operation of the RTU 22*b* may be controlled from the mobile station 18.

It will be understood by those of ordinary skill in the art that the operation of the other RTUs 22 is substantially similar to the operation of the RTU 22*b* and therefore will not be described. However, neither the RTU 22*a* nor the RTU 22*e* receives data from another RTU for sending to yet another RTU. Also, the RTU 22*d* operates in a manner similar to that of the RTU 22*c*, transmitting and sending data to the transmitter-receiver 66 of the mobile station 18. Also, data transmission from the RTU 22*e* to the RTU 22*d* is conducted via the repeater 24, which receives the data transmission from the RTU 22*e* and sends it to the RTU 22*d*. The repeater 24 may receive and send data simultaneously, and may also receive and send control signals transmitted by the transmitter-receiver 66 for controlling the operation of the RTU 22*e*.

The transmitter-receiver 66 of the mobile station 18 receives data transmissions from the RTUs 22*c* and 22*d* and sends the data to the computer 62 via the interface 68. The computer 62 in turn processes the data, stores the processed data, and outputs the processed data to one or more of the output devices 72 via the interface 76. The computer 62 may be programmed to detect the occurrence of critical test events such as the reaching of, for example, target test pressure, maximum test pressure and minimum test pressure, and to issue notification alarms in response to these detections.

As discussed above, the computer 62 processes pipeline 12 data and other data received from the RTUs 22 and the pressure system 14. It will be understood by those of ordinary skill in the art that the computer 62 may process the data from these sources either independently or in combination, as required. The computer 62 may generate logs corresponding to ambient temperature, ground temperature, pipeline 12 temperature, and internal pipeline 12 pressure. Processing by the computer 62 further includes, but is not limited to, reconciling temperature/pressure data using mathematical models known in the art, calculating pressure loss/gain rates, and calculating pressure as a function of volume and/or generating pressure-versus-volume plots to provide an indication of pipe yield during the above-described pressurization process.

In view of the foregoing, it is clear that the hydrostatic testing of the pipeline 12 can be effectively monitored in real time or near-real-time from a single location, that is, the mobile station 18. In addition, the overall hydrostatic test system 10 operation may be monitored from wherever data network 34 access is available. As discussed above, the computer 62 receives and processes data from the measurement equipment 58 and the RTUs 22. In addition to outputting the data and the processed data to the output devices 72, the computer 62 outputs the data and the processed data to the two-way satellite link 70 which, in turn, transmits the data to the satellite 26. The satellite 26 transmits the data to the server 30 via the satellite gateway 28. This data is able to be viewed in real-time or near-real-time on one or more of the user interfaces 32 by downloading the data from the server 30 to each user interface 32 via the data network 34.

It will be understood by those of ordinary skill in the art that any or all of the foregoing data transmissions may be encrypted.

The above-described ability to access, monitor and review in real time or near-real time the hydrostatic test system 10 operation, from the mobile station 18 and from wherever data network 34 access is available, provides for faster acceptance or rejection of the hydrostatic testing by the pipeline operator. Once the hydrostatic testing of the pipeline 12 has been accepted or rejected, operation of the hydrostatic test system 10 is ended and the system is disassembled. The hydrostatic pressure system 14, the plurality of RTUs 22, and the repeater 24 are disconnected from the pipeline 12. Also, the pressure system 14 is disconnected, where necessary, from the mobile station 18. The aforementioned components are then transported away from the pipeline 12. The pipeline 12 is returned to normal service or, if the pipeline 12 is a new pipeline, normal service may begin.

It will be understood by those generally skilled in the art that the pipeline 12 may be divided into a series of test sections and that the above-described operation may apply to a particular test section of the pipeline 12, in which case the above-described operation may be repeated as necessary for the other sections of the pipeline 12. Once all required hydrostatic tests of the sections of the pipeline 12 have been accepted as successful, the pipeline 12 is returned to normal service or, if the pipeline 12 is a new pipeline, normal service may begin.

Figure 4:
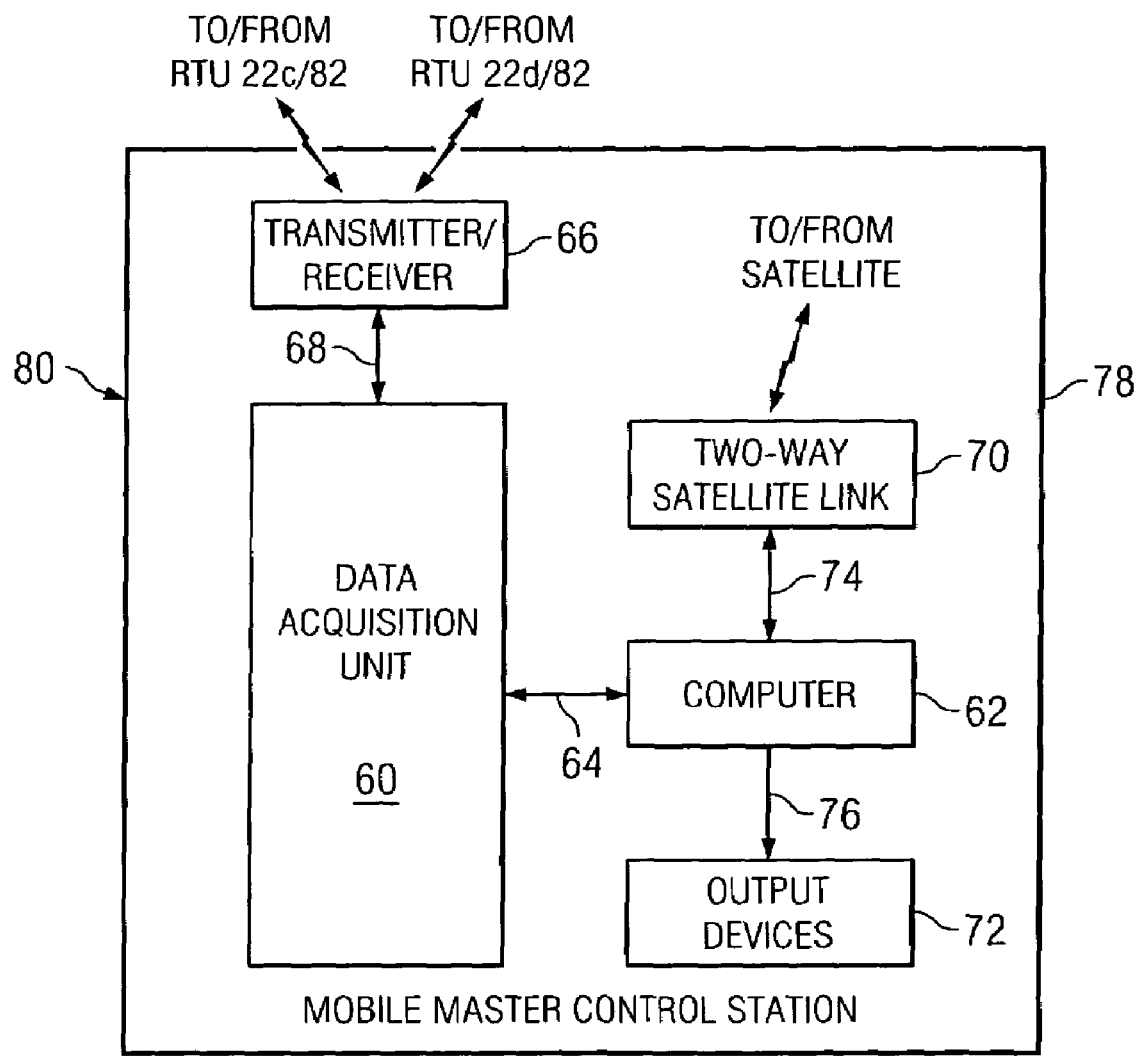
FIG. 4 is a schematic view of a mobile master control station of the system of FIG. 1 according to another embodiment.
Figure 5:
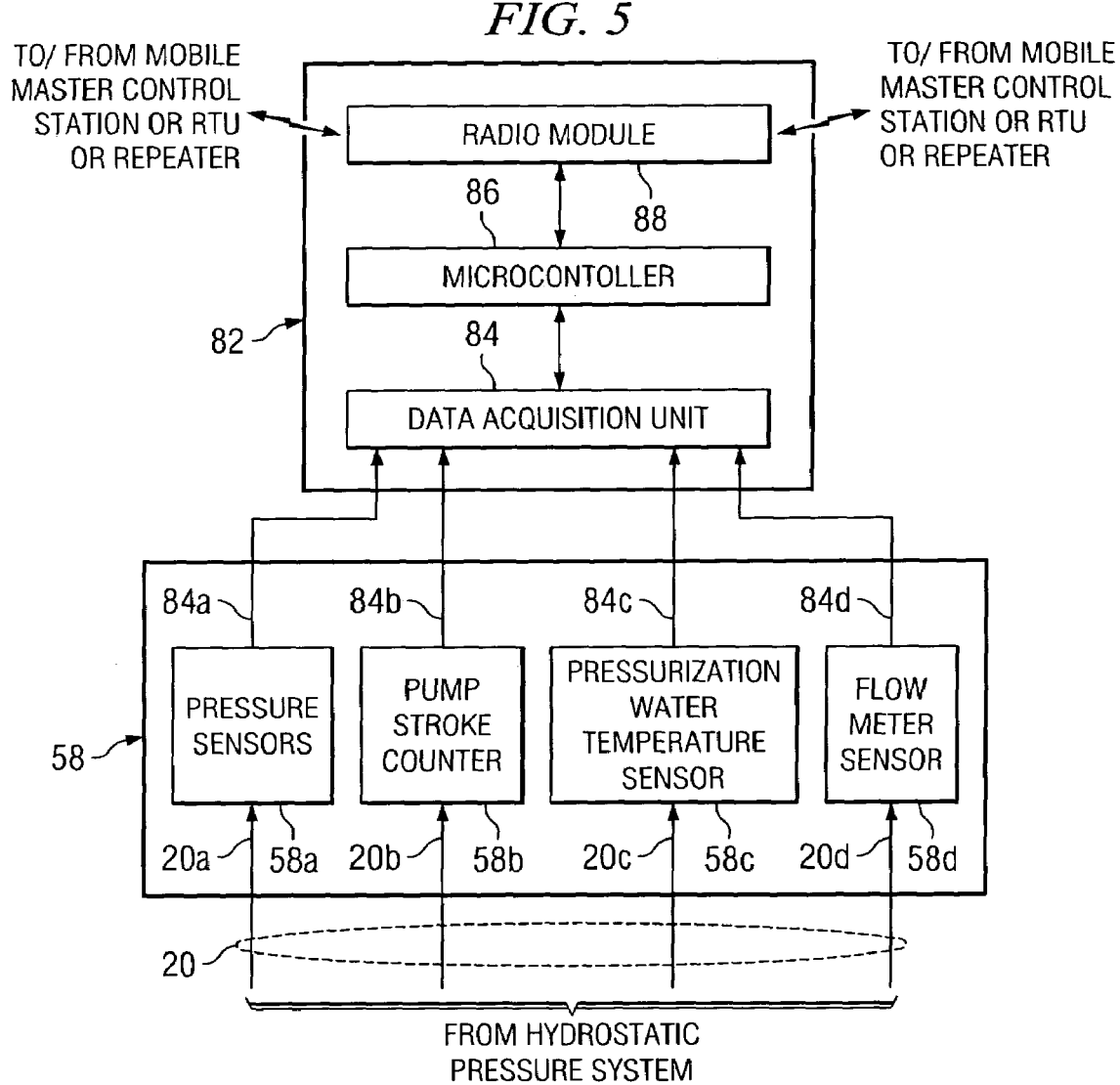
FIG. 5 is a schematic view of a portable remote telemetry unit in communication with the mobile master control station of the embodiment of FIG. 4.

Referring to FIG. 4, an alternate embodiment of the mobile master control station is generally referred to by the reference numeral 80 and includes components of the embodiment of FIG. 3, which components are given the same reference numerals. However, unlike the embodiment of FIG. 3, the mobile station 80 does not include the measurement equipment 58 and the signal lines 60a through 60d. Instead, the signal lines 60a through 60d are entirely removed and, as shown in FIG. 5, the measurement equipment 58 is connected to a portable remote telemetry unit (RTU) 82. More particularly, the measurement equipment 58 remains connected to the hydrostatic pressure system 14 via the plurality of lines 20, which includes the above-described lines 20a, 20b, 20c and 20d connected to the pressure sensors 58a, the pump stroke counter 58b, the pressurization water temperature sensor 58c and the flow meter sensor 58d, respectively, which, in turn, are connected to a data acquisition unit 84 via signal lines 84a, 84b, 84c and 84d, respectively. It is understood that additional conventional control components used to control at least a portion of the pressure system 14 such as, for example, a pump controller, may be connected to the data acquisition unit 84. Similar to each RTU 22, the RTU 82 further includes a programmable microcontroller 86 coupled to the data acquisition unit 84 and to a radio module 88, which may comprise a 900-MHz spread spectrum radio and a high-gain omni-directional or Yagi antenna connected to a 10-meter antenna mast assembly. It is understood that the data acquisition unit 84 may be integrally combined with the microcontroller 86 and/or the radio module 88.

In operation, with continuing reference to FIGS. 1 through 5, the mobile station 80 operates in a manner similar to that of the embodiment of FIG. 3 except that the data acquisition unit 60 receives data transmissions corresponding to the physical measurements of the sensors 58a, the counter 58b and the sensors 58c and 58d from the RTU 82, instead of receiving the data via a plurality of signal lines as in the embodiment of FIG. 3. This data may be received by the transmitter-receiver 66 either directly from the RTU 82 or via one or more of the RTUs 22 and/or the repeater 24, depending upon the location of the RTU 82 relative to the other components of the system 10. Further, the mobile station 80 may remotely control the operation of the RTU 82 by sending control signals from the transmitter-receiver 66 and to the radio module 88 of the RTU 82, either directly or via one or more of the RTUs 22 and/or the repeater 24. In a similar manner, the mobile station 80 may remotely control the operation of any portion of the pressure system 14 that is controlled by the conventional control components connected to the data acquisition unit 84. It is understood that the data acquisition unit 84, the microcontroller 86 and the radio module 88 of the RTU 82 operate in a manner similar to that of the above-described corresponding components of the RTU 22b.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method for hydrostatic testing of a pipeline that is not in service, comprising:
   hydrostatically pressurizing the pipeline;
   temporarily connecting at leant one portable remote telemetry unit to the pipeline for measuring variables associated with the pipeline;
   transmitting to a central location data corresponding to the variable measurements associated with the pipeline from the at least one portable remote telemetry unit; and
   disconnecting the at least one portable remote telemetry unit from the pipeline.

2. The method of claim 1 wherein the variables associated with the pipeline include the internal pressure of the pipeline and the temperature of the pipeline.

3. The method of claim 1 wherein the step of connecting comprises temporarily connecting a pressure sensor to the pipeline and temporarily connecting a temperature sensor to the pipeline.

4. The method of claim 1 wherein the at least one portable remote telemetry unit is in two-way wireless communication with a transmitter-receiver located at the central location.

5. The method of claim 1 further comprising remotely controlling the at least one portable remote telemetry unit from the central location.

6. The method of claim 1 further comprising processing the data at the central location.

7. The method of claim 6 wherein the processing includes generating logs corresponding to the variable measurements, calculating pressure loss rates, calculating pressure gain rates and reconciling data corresponding to the internal temperature of the pipeline with data corresponding to the internal pressure of the pipeline.

8. The method of claim 6 further comprising outputting the processed data to an output device.

9. The method of claim 6 wherein the step of processing includes comparing data corresponding to at least one variable measurement with a predetermined value and activating an alarm when the data corresponding to at least one measured variable is within a predetermined range of the predetermined value.

10. The method of claim 6 further comprising transmitting the processed data from the central location and to a sewer.

11. The method of claim 10 wherein the step of transmitting the processed data comprises providing a two-way satellite link at the central location, providing a satellite in communication with the two-way satellite link and with a satellite gateway wherein the satellite gateway is in communication with the server, sending the processed data from the two-way satellite link and to the gateway via the satellite, and sanding the processed data from the gateway and to the server.

12. The method of claim 11 wherein the satellite is in two-way wireless communication with the two-way satellite link and wherein the satellite gateway is in two-way wireless communication with the satellite.

13. The method of claim 10 further comprising sending the processed data from the server and to at least one user interface.

14. The method of claim 13 wherein the processed data is sent to the at least one user interface over a data network.

15. The method of claim 1 wherein the step of hydrostatically pressurizing comprises providing a means for hydrostatically pressurizing the pipeline with water and measuring variables associated with the hydrostatically pressurizing means.

16. The method of claim 15 wherein the variables associated with the hydrostatically pressurizing means include pressure, the water flow rate and the water temperature.

17. The method of claim 15 wherein the step of measuring variables associated with the hydrostatically pressurizing means comprises transmitting to the central location data corresponding to the variable measurements associated with the hydrostatically pressurizing means.

18. The method of claim 15 wherein the step of measuring variables associated with the hydrostatically pressurizing means comprises connecting an additional portable remote telemetry unit to the hydrostatically pressurizing means and transmitting data corresponding to the variable measurements associated with the hydrostatically pressurizing means from the additional portable remote telemetry unit and to the central location.

19. The method of claim 18 wherein the additional portable remote telemetry unit is in two-way wireless communication with a transmitter-receiver located at the central location.

20. The method of claim 15 further comprising remotely controlling at least a portion of the hydrostatically pressurizing means.

21. The method of claim 20 wherein the step of remotely controlling comprises connecting an additional portable remote telemetry unit to the hydrostatically pressurizing means and transmitting control signals form the central location and to the additional portable remote telemetry unit.

22. The method of claim 21 wherein the additional portable remote telemetry unit is in two-way wireless communication with a transmitter-receiver located at the central location.

23. The method of claim 1 further comprising transporting a mobile control station to the central location so that die mobile control station receives the data transmitted from the at least one portable remote telemetry unit.

24. The method of claim 23 wherein the mobile control station comprises a computer for processing the data.

25. The method of claim 24 further comprising transmitting the processed data from the mobile control station and to a server.

26. The method of claim 25 further comprising sending the processed data from the server and to at least one user interface.

27. The method of claim 1 further comprising temporarily connecting at least one other portable remote telemetry unit to the pipeline for measuring variables associated with the pipeline.

28. The method of claim 27 further comprising transmitting data corresponding to the variable measurements measured by the at least one other portable remote telemetry unit from the at least one other portable remote telemetry unit end to the central location.

29. The method of claim 27 further comprising transmitting data corresponding to the variable measurements measured by the at least one other portable remote telemetry unit from the at least one other portable remote telemetry unit and to the at least one portable remote telemetry unit.

30. The method of claim 29 further comprising transmitting the data corresponding to the variable measurements measured by to at least one other portable remote telemetry unit from the at least one other portable remote telemetry unit and to the central location.

31. The method of claim 27 further comprising transmitting data corresponding to the variable measurements measured by the at least one other portable remote telemetry unit from the at least one other portable remote telemetry unit and to a repeater.

32. The method of claim 31 further comprising transmitting the data corresponding to the measurements taken by the at least one other portable remote telemetry unit from the repeater end to the at least one portable remote telemetry unit.

33. The method of claim 32 further comprising transmitting the data corresponding to the variable measurements measured by at least one other portable remote telemetry unit from the at least one other portable remote telemetry unit and to the central location.

34. The method of claim 31 further comprising transmitting the data corresponding to the variable measurements measured by the at least one other portable remote telemetry unit from the repeater and to the central location.

35. The method of claim 27 farther comprising disconnecting the at least one other portable remote telemetry unit.

36. The method of claim 28 further comprising remotely controlling the at least one other portable remote telemetry unit.

* * * * *

UNITED STATES PATENT AND TRADEMARK OFFICE
CERTIFICATE OF CORRECTION

PATENT NO. : 7,066,010 B2
APPLICATION NO. : 10/842950
DATED : June 27, 2006
INVENTOR(S) : Layton Bryant and Eric Burch It is certified that error appears in the above-identified patent and that said Letters Patent is hereby corrected as shown below:

In Claim 1:
Column 8, line 33, change "leant" to --least--

In Claim 10:
Column 9, line 5, change "sewer" to --server--

In Claim 11:
Column 9, line 13, change "sanding" to --sending--

In Claim 21:
Column 9, line 55, change "form" to --from--

In Claim 23:
Column 10, line 2, change "die" to --the--

In Claim 28:
Column 10, line 22, change "end" to --and--

In Claim 30:
Column 10, line 31, change "to" to --the--

In Claim 32:
Column 10, line 42, change "end" to --and--

In Claim 33:
Column 10, line 46, after "by" insert --the--

UNITED STATES PATENT AND TRADEMARK OFFICE
CERTIFICATE OF CORRECTION

PATENT NO. : 7,066,010 B2
APPLICATION NO. : 10/842950
DATED : June 27, 2006
INVENTOR(S) : Layton Bryant and Eric Burch It is certified that error appears in the above-identified patent and that said Letters Patent is hereby corrected as shown below:

In Claim 35:
Column 10, line 54, change "farther" to --further--

Signed and Sealed this

Twenty-first Day of November, 2006

JON W. DUDAS
*Director of the United States Patent and Trademark Office*